United States Patent [19]

Hanst

[11] Patent Number: 5,542,977
[45] Date of Patent: Aug. 6, 1996

[54] COMPOSITION FOR SOIL SURFACE STABILIZATION

[76] Inventor: Donald R. Hanst, 7911 Windy Acre, Houston, Tex. 77040

[21] Appl. No.: 386,928

[22] Filed: Feb. 10, 1995

Related U.S. Application Data

[63] Continuation-in-part of Ser. No. 141,487, Oct. 22, 1993, Pat. No. 5,401,312.

[51] Int. Cl.$^6$ .................................................. C04B 28/22
[52] U.S. Cl. .......................... 106/706; 106/710; 106/792; 106/793; 106/DIG. 1; 106/900; 106/811; 404/76; 405/266
[58] Field of Search .................................. 106/710, 705, 106/706, 792, 793, 811, DIG. 1, 900; 264/DIG. 49; 405/266; 404/75, 76, 90

[56] References Cited

U.S. PATENT DOCUMENTS

| | | | |
|---|---|---|---|
| 1,934,689 | 2/1931 | Andrews et al. | |
| 2,698,252 | 12/1954 | Havelin et al. | 106/706 |
| 2,815,294 | 12/1957 | Havelin et al. | 100/700 |
| 3,076,717 | 2/1963 | Minnick | 106/D. 161 |
| 3,651,002 | 3/1972 | Higashimuca et al. | 260/9.6 |
| 3,732,023 | 5/1973 | Rank et al. | 404/90 |
| 3,971,222 | 7/1976 | Griffith, Jr. | 61/36 R |
| 4,018,619 | 4/1977 | Webster | 106/D. 161 |
| 4,084,381 | 4/1978 | Cain et al. | 106/D. 161 |
| 4,105,463 | 8/1978 | Angelbeck | 106/900 |
| 4,233,015 | 10/1980 | Teague et al. | 405/263 |
| 4,312,605 | 1/1982 | Clarke | 405/264 |
| 4,318,835 | 3/1982 | Clarke | 264/36 |
| 4,329,090 | 5/1982 | Tengue et al. | 405/263 |
| 4,464,353 | 8/1984 | Hains | 423/640 |
| 4,473,320 | 9/1984 | Register | 404/75 |
| 4,496,267 | 1/1985 | Graedinger | 404/82 |
| 4,514,307 | 4/1985 | Chestnut et al. | 210/751 |
| 4,549,834 | 10/1985 | Allen | 404/75 |
| 4,615,809 | 10/1986 | King | 106/706 |
| 4,746,249 | 5/1988 | Haigh et al. | 405/264 |
| 4,871,283 | 10/1989 | Wright | 405/263 |
| 4,990,025 | 2/1991 | Young et al. | 404/92 |
| 5,018,906 | 5/1991 | Bonier-Sahuc | 405/263 |
| 5,116,417 | 5/1992 | Walker et al. | 106/D. 161 |
| 5,122,012 | 6/1992 | Walker | 405/263 |
| 5,180,742 | 2/1993 | Hoffman | 75/223 |

OTHER PUBLICATIONS

1993 "Standard Specifications for Construction of Highways, Streets and Bridges", p. 228, Texas Department of Transportation (no month).
"After five years, lime base stabilization holds up." Roads & Bridges, May, 1993.

*Primary Examiner*—Anthony Green
*Assistant Examiner*—Michael Marcheschi
*Attorney, Agent, or Firm*—Liddell, Sapp, Zivley, Hill & LaBoon, L.L.P.

[57] ABSTRACT

A slurry composition for stabilizing the upper layers of the earth comprising a lime and a fly ash having a calcium oxide content of less than 18% and water.

9 Claims, 1 Drawing Sheet

COMPOSITION FOR SOIL SURFACE STABILIZATION

CROSS-REFERENCE TO RELATED APPLICATION

This application is a continuation-in-part of application Ser. No. 08/141,487 filed Oct. 22, 1993, U.S. Pat. No. 5,401,312.

TECHNICAL FIELD OF THE INVENTION

The present invention relates to compositions for strengthening and stabilizing the surface layers of the earth, so as to provide a solid foundation for roadbeds, railways and the like. This invention also relates to a method for rehabilitating asphalt and concrete roads and foundations. More particularly, the present invention discloses lime-fly ash slurry compositions that are capable of suspending a large proportion of solid particles for an extended period of time, and a method for deploying that slurry into the surface layers of the earth to create a strong, stabilized bed.

BACKGROUND OF THE INVENTION

Lime has long been known to be useful in various structural applications. Typically, the starting substance for lime applications is either hydrated (slaked) lime or unhydrated (quicklime). Several patents disclose methods and equipment for hydrating lime, including U.S. Pat. Nos. 783,570; 1,579,766; 1,664,598; and 2,044,553.

In addition to lime, fly ash has, to a limited extent, been also used to stabilize road or railroad beds. Similarly, lime-fly ash mixes have been used in the dry form and, to a limited extent, such mixes have also been used in a high pressure injection slurry medium.

Typically, however, such dry mixes as well as the slurries require special care in mixing and handling. For example, systems that provide for the distribution of powdered constituents on the earth, followed by the addition of water and subsequent mixing into the earth create substantial dusting problems, which are exacerbated by the caustic nature of the dust. In addition, when quicklime is used, such systems may pose short-term hazards to operators, as the hydration reaction is exothermic. Finally, the high pressure injection slurries are not directed to the surface layers of the soil and they also present problems of a fast setting time that requires immediate injection. Some examples of patents disclosing various lime/ash mixtures are as follows:

U.S. Pat. No. 4,496,267 discloses prereacting a mixture of incinerator ash, rather than fly ash, and lime for several days, and then adding lime and water to the prereacted mixture and working it into the surface of the road bed.

U.S. Pat. No. 4,105,463 discloses a composition comprising about 2–8 percent lime, about 8–36 percent fly ash, from 66 to 90 percent aggregate, and 0.5–4 percent sludge. These are mixed to produce a composite to which water can be added to form a cementitious product.

U.S. Pat. No. 3,076,717 discloses a composition having little early compressive strength but having very high early bearing power. The composition comprises 10–30 percent of a pozzolan such as fly ash, 70–90 percent of an aggregate having a specific particle size distribution, about 2–6 percent lime, and excess water of about 7–10 percent.

U.S. Pat. Nos. 2,564,690, 2,698,252, and 2,815,294 disclose compositions for stabilizing soil having particular fineness moduli, comprising lime, fly ash and fine aggregate.

U.S. Pat. No. 4,329,090 discloses a method of mixing quicklime and water to form a hot hydrated lime slurry and working the hot slurry into the earth before it cools. The patent also discloses parts of an apparatus for accomplishing the mixing of quicklime into the water in a particular manner. Specifically, the '090 patent teaches injecting the quicklime below the surface of the water and stirring the mixture, to prevent any localized concentration of quicklime particles, the hydration of which might be undesirably violent.

Likewise, systems exist which provide for the injection of a lime-fly ash slurry into the subsurface layers of the earth. These systems not only require special injection equipment for piercing the upper layers of the earth, but also typically require that the slurry be mixed only minutes before it is injected, in order to avoid undesirable setting of the mixture before injection. This greatly reduces the flexibility of the operation with respect to supply, transport and procedure.

U.S. Pat. No. 4,084,381 discloses a lime-fly ash slurry comprising about 20–60 percent solids. The slurry is injected at predetermined, spaced-apart locations, at predetermined depths up to 10–20 feet. Of the solids, the lime comprises about 25–50 percent by weight. The lime preferably includes at least 20 percent by weight water. The fly ash is preferred to be the self-hardening type, having preferably greater than 10 percent by weight calcium oxide.

U.S. Pat. No. 4,233,015 discloses a method of treating subsurface layers of the earth by mixing quicklime and water to form a hot hydrated lime slurry and injecting the hot slurry into the earth before the slurry cools. Specifically, the '015 patent teaches injecting the quicklime below the surface of the water and using a series of rotating paddles to stir the mixture and prevent any localized concentration of quicklime particles.

U.S. Pat. No. 4,871,283 discloses injecting a mixture consisting essentially of water, particulate hydrated lime and particulate fly ash, wherein the solids are present as about 25 to 200 percent by weight of the water. The disclosed ratio of lime to fly ash ranges from 3 to 1 to about 1:10. It is preferred that Type C fly ash having at least 5 percent and preferably at least 10 percent calcium oxide be used, and it is stressed at column 7, lines 16–22, that the injection should occur within ten minutes of mixing of the components.

U.S. Pat. No. 4,871,283 also specifically teaches that Class F fly ash cannot be used in the patented method without other additives. This is directly contrary to the nature of the present invention.

Many states have prior art specifications relating to the use of lime and of fly ash as stabilizing systems for road beds. For example, the Texas Department of Transportation has issued "Standard Specifications for Construction of Highways, Streets and Bridges." Its 1993 edition, at page 228, continues to call for the application of fly ash in "dry form" only. As will be demonstrated, the present invention will reduce both the cost and the environmental hazards that result from such specifications.

The present invention avoids the problems associated with the prior systems and provides a safe, economical composition for stabilizing a road bed. Other objects and advantages of the invention will appear from the following description.

SUMMARY OF THE INVENTION

The present invention is a composition for stabilizing and strengthening the upper layers of the earth's surface using a slurry that is low cost, safe and free of environmental hazards. The method for application of the composition preferably comprises the steps of: mixing an amount of quicklime and fly ash with an amount of water to form a slurry, applying the slurry to the surface or road bed and then mixing said slurry into the soil of the surface by cutting, disking, scarifying and, if needed by pulverizing. Accordingly aspects of embodiments of my invention provide a composition that a) eliminates the potential problems of premature setup and curing of the material after mixing and prior to application so as to reduce the risk of valve, dispenser and tank equipment repairs;

b) maintains the fly ash in proper suspension so as to permit a proper uniform application without clogging the valves, dispensers and tank equipment;

c) will not be too brittle and inflexible to serve as a stabilized road bed or support base;

d) provides a superior, more durable base and foundation for a road bed, building foundation or railroad bed; and e) has a substantially lower cost of mixing and application.

Another aspect of an embodiment of my invention is to provide a composition in which the fly ash will remain in suspension and stable for periods of time in excess of ten minutes.

BRIEF DESCRIPTION OF THE DRAWINGS

The manner in which embodiments of my invention are made and used as set forth in the following detail specifications and the drawing in which.

DETAILED DESCRIPTION OF THE PREFERRED EMBODIMENT

Figure 1:
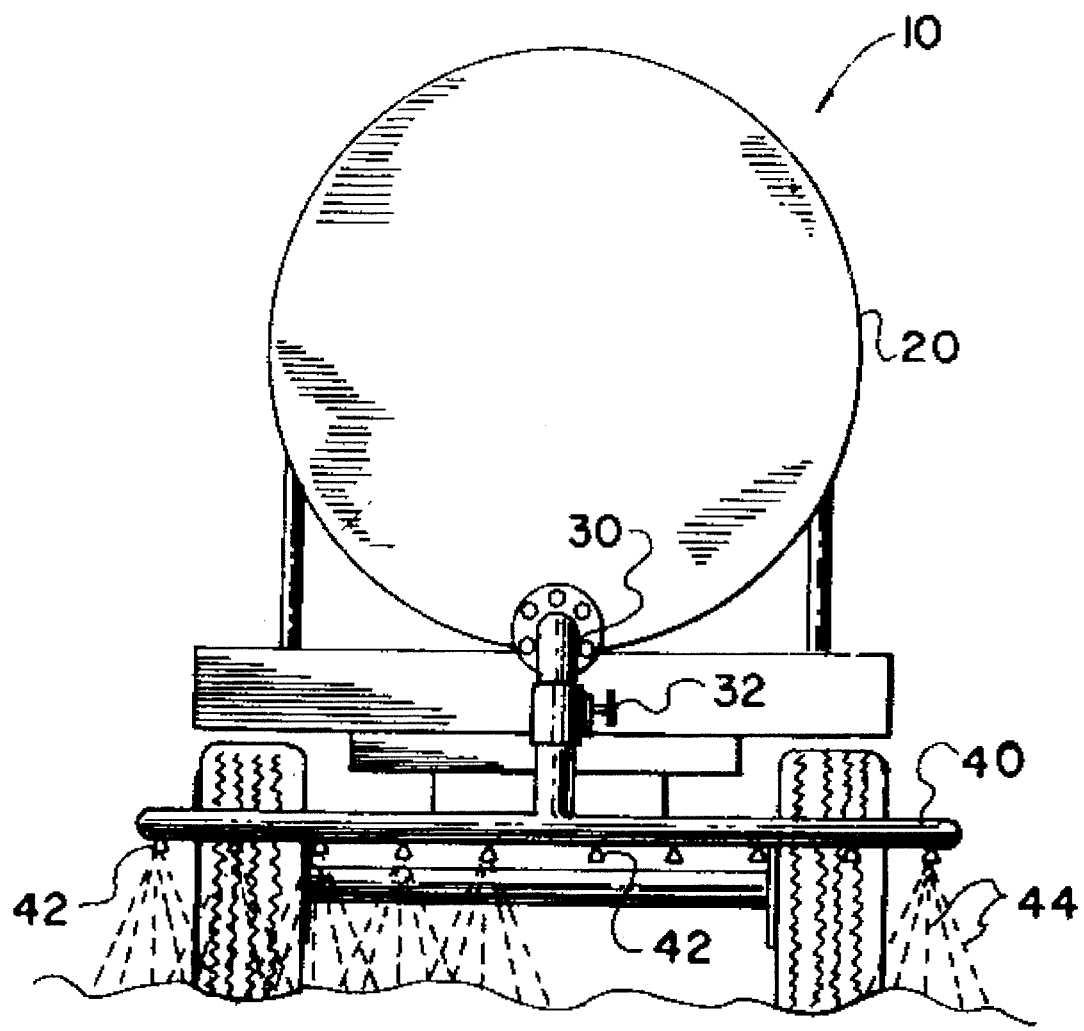
FIG. 1 illustrates an elevational view of the rear of a tank truck that may be used to dispense and spread the slurry of my invention.

According to the preferred embodiment of my invention, quicklime is mixed with fly ash and then mixed with water to form a slurry for application to a road bed. This slurry composition is preferably mixed in a mixing tank such as those manufactured and sold under the trademark Perma Batch® mixers by the Chemical Lime Group of Fort Worth, Tex. After mixing and without undue delay, the slurry is transferred by a pump to the tank 20 of a dispensing truck 10 for transportation to the road bed or other application site where it is to be applied. At the application site, the slurry flows by gravity (or pumped if desired) through the discharge pipe 30, a control valve 32 to the spreader bar 40 from which the slurry is sprayed, as at 44, upon the surface of the road bed. Thereafter, the slurry is cut into the road bed by earth-working implements such as disks, scarifiers and pulverizers. Accordingly, the slurry is not injected into the ground. Instead, it is preferably distributed evenly onto the earth and worked into the upper 24 inches of earth by conventional methods. Because the present method involves distributing and mixing a slurry rather than a dry powder, the dusting and other environmental hazards associated with dry distribution of lime are avoided.

My preferred slurry composition includes quicklime which upon mixing with water, results in an exothermic reaction that generates heat. The advantage of using quicklime (unhydrated lime) is that it is not necessary to pay additional freight costs associated with the transportation of the waters of hydration, as is the case of using the hydrated lime. Thus, a cost savings may be realized through the use of quicklime. Surprisingly, I have also found that if quicklime is used, such will also maintain the fly ash in suspension within the slurry and avoid any problem of settling out, of clogging the equipment or of uneven distribution on the ground surface.

I also prefer to use a Class F fly ash because it has a low calcium oxide level that reduces the settling tendency of the fly ash. The fly ash may be added to the mixing tank slurry after all of the lime has been mixed with the water, or it may be simultaneously with the addition of the lime and water. The type of fly ash employed in the slurry is a pozzolanic by-product of coal-burning power plants. Preferably, the fly ash is Class F fly ash, having a calcium oxide content of less than 18 percent. Class F fly ash is a common by-product of the combustion of anthracite, bituminous and lignite coal. In contrast, Class C fly ash is produced in the combustion of sub-bituminous coal or lignite coal. Because it contains more calcium than Class F, Class C fly ash typically sets up more quickly and is therefore more difficult to use in the method of the present invention. However, by adding additional water, the setting time can be extended. The presence of excessive (>18% by weight) calcium oxide results in rapid setting of the slurry, reducing available work time and often fouling equipment.

Preferably, whether the fly ash is Class F or Class C, it meets the American Society of Testing Materials (ASTM) standard C618-85. This is preferred as it gives a standard for the material.

According to the preferred embodiment, in which Type F ash is used, it is possible to store the slurry for extended periods, on the order of several hours, without appreciable setting. Specifically, this slurry and those encompassed by this invention are capable of being held in suspension without setting of the fly ash for a period of time in excess of ten minutes. To achieve this result, if Class C fly ash is used, it may be necessary to add water or chemical retarders to the slurry, so that premature setting of the slurry is avoided.

The weight ratio of fly ash to lime should be from about 10:1 to 1:4. A preferred ratio of fly ash to lime in the slurry is approximately 3 to 1 by weight. The final slurry preferably has a solids content of about 35 percent and greater by weight. Such a slurry can be maintained without setting up for several hours, so that it can be mixed at a distant plant, if desired, and trucked to the point of application as explained above. In some instances, the ratio of lime to fly ash will be set by owner of the road, such as the Highway Department.

The preferred embodiment of the present invention is best suited for use in sandy, silky soils. In such environments, it will provide excellent results because the resulting layer formed by the interaction of the slurry ingredients with the soil forms a cement-like sand with good stability. The fly ash is a necessary ingredient in these applications, because such soils contain little or no aluminum, silica and iron with which the lime can bond. The addition of fly ash provides a source of aluminum, silica and iron, which, together with the lime, are capable of forming weak bonds within the soil layer. The soil treated in this manner is flexible and able to resist large compressive forces.

While a preferred embodiment of the invention has been shown and described, modifications thereof can be made by one skilled in the art without departing from the spirit of the invention. For example, my slurry composition may use, as a substitute for the quicklime, a hydrated or slaked lime. Such will be quite acceptable if an additive is used to insure that the fly ash remains in suspension. One such additive that may be used to insure such suspension of the fly ash is bentonite. In addition, Class C fly ash may be used as an acceptable substitute for the Class F fly ash. If so used, care should taken to consider the addition of additional water or retarders to the slurry, so that premature setting of the slurry is avoided.

I claim:

1. A slurry composition for stabilizing soil, comprising:
   (a) lime;
   (b) fly ash; and
   (c) water, in which the slurry composition has a solids content in excess of 35% by weight and the amount of fly ash is approximately three times the amount of lime by weight, the slurry composition capable of being held in suspension without setting of the fly ash for a period substantially in excess of 10 minutes.

2. The composition of claim 1 in which the lime is hydrated lime.

3. The composition of claim 1 wherein the lime is quicklime.

4. The composition of claim 1 wherein the fly ash is Class F fly ash.

5. A slurry composition for stabilizing the soil, comprising lime, fly ash and water in which the slurry composition has a solids content in excess of 35% and the weight-ratio of fly ash to lime is from 10:1 to 1:4, the slurry composition capable of being held in suspension without setting of the fly ash for a period substantially in excess of 10 minutes.

6. The composition of claim 5 in which the lime is hydrated lime.

7. The composition of claim 5 wherein the lime is quicklime.

8. The composition of claim 5 wherein the fly ash is Class F fly ash.

9. A slurry composition for stabilizing soil, consisting essentially of:
   (a) quicklime;
   (b) Class F fly ash, having a calcium oxide content of less than 18% by weight;
   (c) water;
   (d) the slurry composition has a solids content in excess of 35% by weight;
   (e) the amount of fly ash being approximately three times the amount of quicklime by weight; and
   (f) the slurry composition capable of being held in suspension without setting of the fly ash for a period substantially in excess of 10 minutes.

* * * * *